United States Patent [19]

Casberg

[11] Patent Number: 4,546,503
[45] Date of Patent: Oct. 15, 1985

[54] POOL CHEMICAL TABLET AND CONTAINER

[75] Inventor: John M. Casberg, Cheshire, Conn.

[73] Assignee: Olin Corporation, Cheshire, Conn.

[21] Appl. No.: 710,728

[22] Filed: Mar. 11, 1985

[51] Int. Cl.$^4$ .......................... E04H 3/18; E03D 9/02
[52] U.S. Cl. .......................................... 4/496; 4/222; 4/228; 4/490; 222/190; 422/279; 422/905
[58] Field of Search .................. 4/228, 227, 222, 496, 4/490, 294, 309, 453; 222/478, 485, 190; 422/277, 263, 905, 264, 275, 276, 278, 279

[56] References Cited

U.S. PATENT DOCUMENTS

| 991,825 | 5/1911 | Bogie | 4/228 |
|---|---|---|---|
| 3,423,182 | 1/1969 | Klasky | 4/228 |
| 3,677,711 | 3/1970 | Bond | 4/496 X |
| 3,837,017 | 9/1974 | McDuffee | 4/228 |
| 4,277,853 | 7/1981 | McDuffee | 4/228 X |
| 4,318,891 | 3/1982 | Kim | 4/228 X |
| 4,350,666 | 9/1982 | Klutts | 4/228 X |
| 4,365,362 | 12/1982 | Corey | 4/228 |
| 4,435,858 | 3/1984 | Dolan | 4/228 |

Primary Examiner—Henry K. Artis
Attorney, Agent, or Firm—Ralph D'Alessandro; Donald F. Clements; Thomas P. O'Day

[57] ABSTRACT

A swimming pool chemical tablet and storage container is provided for use in a skimmer of a forced circulation flow system, the swimming pool chemical tablet having a radial sidewall contact surface which contacts the frusto-conoidally shaped sidewall of the container at a location at least equal to one-half the predetermined height of the tablet to form a tablet-sidewall flow space above the sidewall contact surface to control the rate of dissolution of the tablet when water is circulated in the forced circulation flow system.

18 Claims, 4 Drawing Figures

4,546,503

POOL CHEMICAL TABLET AND CONTAINER

BACKGROUND OF THE INVENTION

This invention relates generally to swimming pool chemicals, and more specifically, it is concerned with a swimming pool chemical tablet and its storage container which are designed to cooperatively control the rate of dissolution of the swimming pool chemical into the water in a forced circulation flow system.

Swimming pool chemicals are routinely used in above ground and below ground swimming pools to control the quality of the water and the clarity of the water. Without such use, bacterial growth and algal growth will progress at a rate which will be unhealthy for bathers and which will create an aesthetically displeasing color in the pool water.

To prevent such occurrences, swimming pool chemicals have been developed which control the clearness of the water and the bacterial count. Typically, calcium hypochlorite and trichloroisocyanuric acid have been employed as swimming pool chemicals. These chemicals are placed in the pool by broadcast spreading of granular particles, dissolving of large aggolomerates, or the liquid feeding of the chemical into the water. Both types of chemicals have their advantages and disadvantages.

Calcium hypochlorite is a chemical that has been relatively easy to manufacture in bulk and which may be placed in a swimming pool by either broadcast spreading, a floating feeder or within a forced flow circulation system where water is pumped through a line into a skimmer immediately adjacent the swimming pool and into which agglomerates in particle form are placed. The circulation of the water through the skimmer into the swimming pool by the action of a pump causes the pool chemical to dissolve. However, calcium hypochlorite has the disadvantage of leaving either residue dispersed in the water in the pool or sediment which settles to the bottom of the pool and which is not dissolvable.

Trichloroisocyanuric acid, when used in agglomerated tablet form, has been found to leave little residue. In a forced flow circulation system these tablets dissolve relatively quickly, for example in a matter of a few days. However, this rapid dissolution rate necessitates frequent treatment of the pool by owners or those tasked with maintaining the quality of the water of the pool. Until now, it has been difficult to control the dissolving rate of trichlorisocyanuric acid tablets to be able to achieve a dissolving rate that permits the owner or maintainer of the pool to utilize a chemical once every ten or fourteen days. The inability to be able to control the dissolution rate of tablets of trichloroisocyanuric acid in skimmers has reduced the attractiveness of this product to the consumer since more frequent and time consuming treatments with the chemical were required.

The foregoing problem has been solved in the design of the present invention by providing a combination swimming pool chemical tablet and storage container which controls the rate of dissolution of the pool chemical tablet when water is circulated in a forced circulation flow system utilized with a swimming pool.

SUMMARY OF THE INVENTION

It is an object of the present invention to provide a swimming pool chemical tablet and storage container for use in a forced circulation flow system that will control the rate of dissolution of the pool chemical.

It is another object of the present invention to provide a swimming pool chemical tablet and storage container that will achieve relatively even dispensing of the pool chemical into the surrounding water when the forced circulation flow system is operating.

It is another object of the present invention to provide a swimming pool chemical tablet and storage container which will reduce the number of times a swimming pool must be treated with chemical by evenly controlling the feed rate of the pool chemical.

It is a feature of the present invention that the storage container has a frusto-conoidally shaped sidewall that forms a closed plane curved surface with an increasing diameter from the bottom to the top of the container.

It is another feature of the present invention that the swimming pool chemical tablet has a radial sidewall contact surface which contacts the frusto-conoidally shaped sidewall of the container to control the rate of dissolution of a tablet when water is circulated in the forced circulation flow system.

It is another feature of the present invention that a tablet-sidewall flow space is created above the point where the radial sidewall contact surface of the tablet and the frusto-conoidally shaped sidewall of the container contact to permit water to freely circulate initially when the forced circulation flow system is operating.

It is another feature of the present invention that the swimming pool chemical tablet has a central bore therein extending from the top of the tablet to the bottom to permit water to fill the bore cavity.

It is an advantage of the present invention that the swimming pool chemical tablet and storage container initially control the dissolution rate of the pool chemical to obtain an even and relatively extended feed rate.

It is another advantage of the present invention that in a forced circulation flow system, virtually no, or extremely slow, dissolution of the swimming pool chemical occurs when the forced flow circulation system is not operating.

It is another advantage of the present invention that the swimming pool chemical tablet and storage container do not require the consumer to touch the chemical in order to treat the swimming pool water.

These and other objects, features and advantages are obtained by providing a swimming pool chemical tablet and storage container which are immersible in water in a skimmer in a forced flow circulation system to evenly dispense chemical over an extended period of time by having a radial sidewall contact surface on the tablet at a location equal to at least about one-half the predetermined height of the tablet that creates with the frusto-conoidally shaped sidewall of the container a tablet-sidewall flow space above the radial sidewall contact surface and between the sidewall of a container to permit water to freely circulate therein when the forced circulation flow system is operating.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
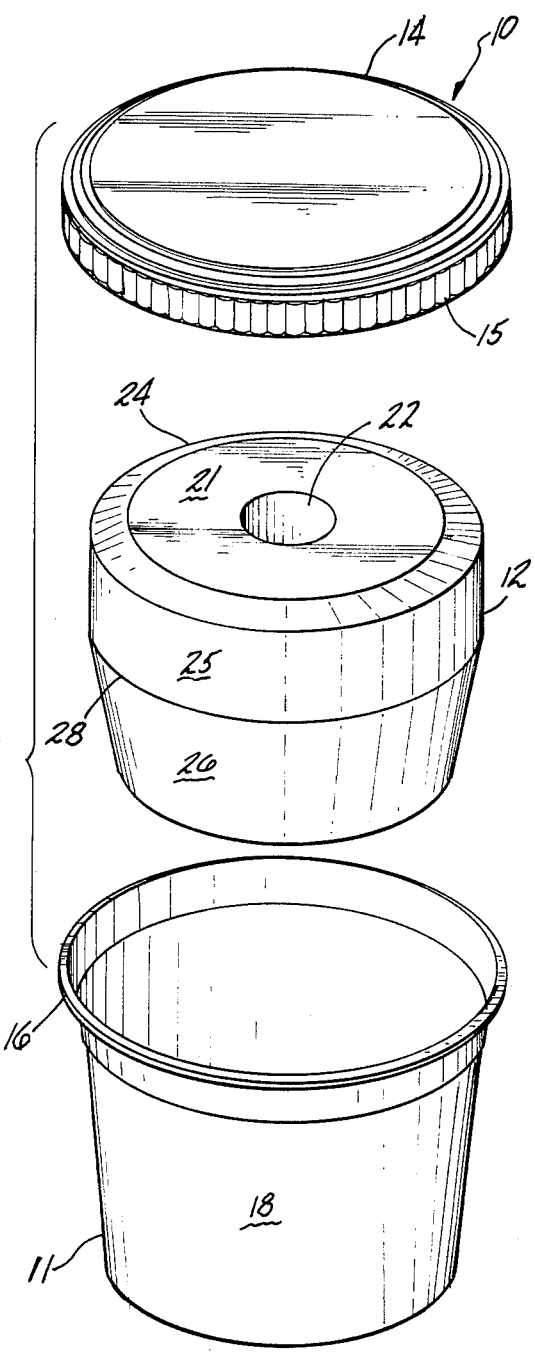
FIG. 1 is an exploded perspective view showing the swimming pool chemical tablet, the storage container and the removable container top.

FIG. 1 shows in an exploded side perspective view the pool chemical tablet and storage container, indicated generally by the numeral 10. As seen the storage container 11 is sized to permit the swimming pool tablet 12 to fit within and to be covered by the removable container top 14.

Figure 2:
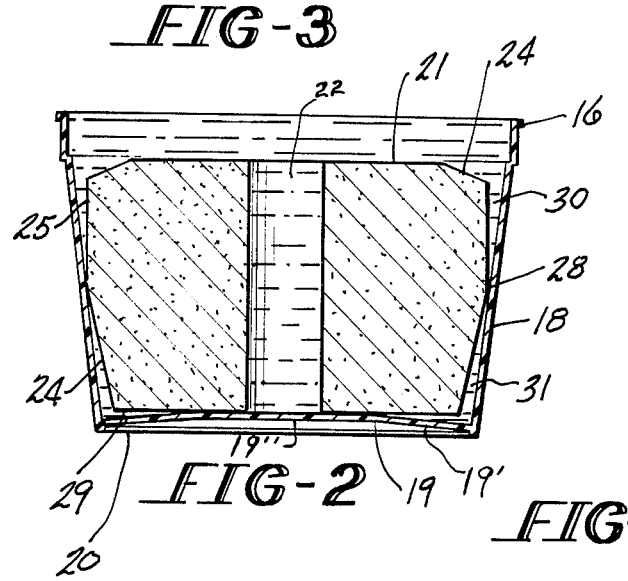
FIG. 2 is a side elevational sectional view of the swimming pool chemical tablet and the storage container with the top removed.

The storage container 11 is shown having a sidewall 18 that is frusto-conoidally shaped and formed by a closed plane curved surface that is angled outwardly from the bottom toward the top so that the sidewall increases in diameter from the bottom toward the container top. The container 11 has a lip portion 16 that extends radially about the outer periphery. The container is formed from an appropriate light weight material, such as polyethylene, so that is is both light weight and somewhat flexible. As best seen in FIG. 2, the container 11 has a curved bottom 19 with an outer angled portion 19' that extends downwardly to contact the sidewall 18 from a central generally flat portion 19". The container 11 may have a bottom support lip 20 beneath the junction of the sidewall 18 and the outer angled portion of the curved bottom 19. The lip portion 16 has a locking groove on the underside (not shown) which permits the removable top 14 to be secured thereto. As seen in FIGS. 1 and 2 the lip portion 16 extends about the entire periphery of the container 11 and overhangs the sidewall slightly.

The top 10, as seen in FIG. 1, is shown having an outer apron portion with serrations or grooves 15 to permit the top to be easily grasped or gripped. On the interior of the top 14 is a rib that extends about the entire peripheral surface (not shown) and which cooperatively interlocks with the locking groove of the lip portion 16 to secure the top 14 to the container 11 when the container and swimming pool tablet 10 are not immersed in water.

As seen in FIG. 1, the tablet 12, preferably formed of trichloroisocyanuric acid, has a two-part sidewall consisting of a top generally straight sidewall portion 25 and a lower or bottom tapered sidewall portion 26 joined together along a radial sidewall contact surface 28 which extends about the entire periphery of the tablet 12. The shape of the tablet 12 can best be described as frusto-conoidal since the shape is somewhat like a truncated cone, but not quite conical. The bottom tapered sidewall portion 26 extends upwardly from the bottom of the tablet 29, seen in FIG. 2, at an outwardly slanting angle with an increasing radius until the radial sidewall contact surface 28 is reached. Above the radial sidewall contact surface 28 the generally straight sidewall portion 25 extends generally vertically upwardly until the angled portion 24 of the tablet top is met. Angled portion 24 extends downwardly from the central flat surface portion 21 of the top and is positioned radially outwardly therefrom.

Figure 3:
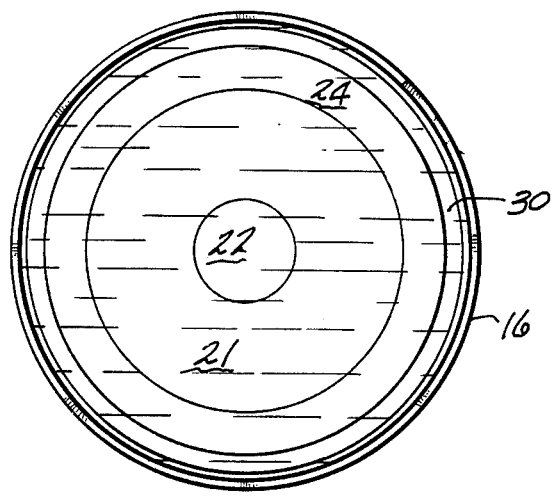
FIG. 3 is a top plan view of the swimming pool tablet inserted within the storage container.

The central flat portion 21 of the top of the tablet 12 is generally circular in shape and can have a bore 22, best seen in FIGS. 1-3, therein. The bore 22 is centrally located in the tablet 12 and preferably is circular, although any geometric shape may be employed. The bore 22 may extend at least partially from the central flat surface portion 21 downwardly toward the bottom 29 of the tablet. Preferably, it extends all the way from the central flat surface portion 21 to the bottom 29 of the tablet. When this full length bore 22 is employed, the bore 22 is sealed against the central generally flat portion 19" of the bottom 19 of the container 11.

Figure 4:
FIG. 4 is a side elevational view diagrammatically illustrating the placement of a swimming pool chemical tablet and storage container within a skimmer used in a forced flow circulation swimming pool system.

The pool chemical tablet and storage container 10 are employed in a forced circulation flow system in conjunction with a swimming pool whereby a pump (not shown) circulates water from the swimming pool through piping into a skimmer 32, seen in FIG. 4, which is connected by appropriate piping to the main body of water of the swimming pool. Skimmer 32 is generally a porous basket-type of design that can be cylindrically-shaped with a removable top. Water fills the skimmer to a level 35 just beneath the top of the skimmer 32. The skimmer 32 is normally located immediately adjacent the main body of water in the swimming pool. The forced circulation flow of water by the pump through the skimmer creates a flow stream through the skimmer into the swimming pool. As seen in FIG. 4, a support shelf 34 exists onto which are placed the container 11 and swimming pool chemical tablet 12. The top 14 has been removed from the container 11.

The action of the water circulating through the skimmer can best be explained from the sectional view shown in FIG. 2. A tablet-sidewall flow space 30 is created between the generally straight sidewall portion 25 and the frusto-conoidally angled sidewall 18 of the container above the radial sidewall contact surface 28. Water fills this tablet-sidewall flow space 30, which extends about the circumference of the tablet when the tablet 12 is within the container 11. This is seen best in FIGS. 2 and 3. This tablet-sidewall flow space 30 permits water to circulate around only the upper part of the tablet above the radial sidewall contact surface 28 to control the dissolution of the pool chemical initially.

The radial sidewall contact surface 28 is located about the outer surface of the tablet 12 at a location that is at least equal to about one-half the predetermined height of the tablet 12 as the height is measured extending from the bottom 29 to the top of the tablet top central flat surface portion 21. Preferably, the radial sidewall contact surface 28 is at a location that is greater than about one-half the predetermined height of the tablet 12. This then reduces the area of the tablet-sidewall flow space 30. It has been found that by varying the location of the radial sidewall contact surface 28 to thereby control the area of the tablet-sidewall flow space, the rate at which the pool chemical tablet 12 initially dissolves can be controlled to achieve a gradual and generally even dissolution. This control is effective during the initial stage of pool treatment because the radial sidewall contact surface 28 does not permit the water to flow or circulate freely about the entire sidewall of the tablet 12 until that contact surface 28 is itself dissolved away.

Beneath the radial sidewall contact surface 28 the tablet-sidewall bottom space 31, seen in FIG. 2, is formed by the bottom tapered sidewall portion 24 and the container sidewall 18. Although water fills this tablet-sidewall bottom space 31 below the radial sidewall contact surface 28, the water is generally static and does not freely circulate even when the forced flow circulation system is operating because the radial contact surface 28 prevents flow between the bottom 19 of the container and the top area and the water in the skimmer 32. This tablet-sidewall bottom space 31 extends beneath the bottom 29 of the tablet 12 because the bottom 29 of the tablet is generally circular and extends generally horizontally across the central generally flat portion 19″ of the container bottom 19 and over the outer angled portion 19′ of the bottom 19 to a distance less than the distance to the sidewall 18 of the container 12.

The central bore 22 extending into and, preferably, through the tablet 12 permits some free circulation of water to increase the surface area of the tablet 12 available for dissolution during the entire time the container 11 and tablet 12 are within the skimmer 32. If a slower rate of dissolution is desired, the central bore 22 need not be extended through the tablet 12, but may only extend along a portion of the predetermined height of the tablet 12 or may not be employed at all.

The extended time over which dissolution of the tablet 12 occurs may be controlled by selecting an appropriately sized tablet and by appropriately sizing the central bore 22. A preferred dissolution period will extend from ten to fourteen days during which the forced circulation system will generally operate during eight hours of the day and be inoperative during the remainder of the time. During the period of non-operation of the forced circulation flow system, dissolution of the pool chemical tablet 12 is reduced to a very minimal rate. The most active dissolution of the tablet occurs during the time of forced circulation flow. The optimum time for dissolution of the entire pool chemical tablet 12 is fourteen days. This permits the tablet to be replaced once every two weeks or only twice a month, which has obvious convenience advantages for a pool owner. It has been found that the dissolving rate is a factor of the water temperature of the pool chemical, as well as the amount of time the forced circulation flow stream is operating.

A typical tablet 12 can be sized to be approximately 24 or 28 ounces and can be approximately 4 inches in diameter across the top and about 2½ inches in height from top to bottom.

In operation, a tablet 12 within the container 11 is placed within a skimmer 32. The top 14 has been removed. The container 11 and tablet 12 are supported by a support shelf 34 positioned so that the container 11 and tablet 12 are completely immersed beneath the water. When the forced circulation flow system is not turned on, there is very minimal dissolution of the tablet 12. However, upon activation of the forced circulation flow system, water flows within the central bore 22 across the central flat surface portion 21 and the radial outer angled portion 24, as well as about the tablet-sidewall flow space 30. This free circulation of water promotes the dissolution of the tablet 12 at a controlled rate initially, since the radial sidewall contact surface 28 prevents the free circulation of water about the tablet-sidewall bottom space 31 below the sidewall contact surface 28. After a period of time, such as approximately 50 hours, the tablet has dissolved sufficiently that the radial sidewall contact surface 28 may be partially dissolved away to begin to permit the free circulation of water from the tablet-sidewall bottom space 31 into the tablet-sidewall flow space 30.

In order to exemplify the results achieved with the swimming pool chemical tablet 12 and the storage container 11 of the instant design when used with a forced flow circulation system employing a skimmer 32, the following Example is provided without any intent to limit the scope of the invention to the discussion therein. The Example is intended to illustrate the result that can be obtained in a forced circulation flow system to accomplish an extended disssolution of the swimming pool tablet 12 and to achieve even dissolution of the swimming pool chemical over a period as long as fourteen days.

EXAMPLE

A tank with 141 gallon capacity and a Hayward SP1084 skimmer placed within was used with a circulating pump to create a forced circulation flow system having a 20 gallon per minute circulation rate. The pump circulated the water through the system 24 hours a day. The water temperature was initially about 80.7° F. A pool chemical tablet of trichloroisocyanuric acid was placed in the skimmer in an open-topped container of the design described earlier.

The tablet's specific gravity was 1.74 gm/cc and its dry weight was about 810 grams. The tablet was immersed for 45 minutes in the water and then weighed to determine its wet weight, or the weight of the tablet plus the weight of the water absorbed by the tablet during the 45 minute immersion period. The tablet was towel dried to remove any surface water prior to weighing. The wet weight was about 850 grams. All weights and measurements in the table following are wet weights and measurements except for the first values which were taken from the dry tablet.

The tablet height was about 2.562 inches and its top diameter was about 4.020 inches. This was also the diameter at the radial sidewall contact surface. The central bore extended completely from top to bottom, initially having a slightly larger diameter at the bottom by about 0.005 inches than at the top of the tablet.

TABLE I

| Time (hrs.) | Tablet Weight (gm) | pH | Water Temp. (°F.) | Dissolving Rate (oz./24 hrs.) | Tablet Top Diameter (in.) | Bore Diameter Top (in.)/ Bottom (in.) | Remarks |
|---|---|---|---|---|---|---|---|
| 0 | 810 | 7.4 | 80.7 | — | 4.020 | 1.00/1.00 | Tablet Height 2.56″ |
| 0 | 850 | 7.4 | 80.7 | — | — | — | — |
| 21.50 | 752 | 7.4 | 82.0 | 4.22 | 4.015 | — | little or no dissolving of the lower 1.7″ of tablet |
| 51.50 | 585 | 7.5 | 84.8 | 4.71 | 4.000 | 1.62/1.27 | No dissolving of the lower 1.52″ of tablet. Tablet Height 2.17″ |
| 76.25 | 423 | 7.6 | 83.3 | 5.54 | 3.750 | 1.90/1.45 | Tablet Height 1.75″ |
| 91.75 | 316 | 7.9 | 83.0 | 5.84 | 3.530 | 2.06/1.60 | Tablet Height 1.68″ |
| 115.75 | 177 | 8.0 | 83.8 | 4.98 | 3.240 | 2.32/1.82 | Tablet Height 1.38″ |
| 139.75 | 78 | 8.1 | 77.9 | 3.24 | 3.000 | 2.44/2.07 | Tablet Height 0.94″ |

TABLE I-continued

| Time (hrs.) | Tablet Weight (gm) | pH | Water Temp. (°F.) | Dissolving Rate (oz./24 hrs.) | Tablet Top Diameter (in.) | Bore Diameter Top (in.)/ Bottom (in.) | Remarks |
| --- | --- | --- | --- | --- | --- | --- | --- |
| 164.50 | 8 | 8.2 | 88.4 | 2.37 | — | — | — |
| 171.00 | 0+ | 8.3 | 89.9 | — | — | — | only small pieces left |

The data in Table I further demonstrates how the bore 22 can add to the evenness of the dissolving rate of the tablet 12 by the increase in diameter of the bore 22 with the passage of time as the height and diameter of the tablet 12 concurrently decrease because of dissolution. This increase in diameter of the bore 22 helps to slow the reduction of the surface area of the tablet 12 available for contact with the surrounding water for dissolution.

At approximately 52.75 hours of operation the tank was drained and refilled with fresh water. Hydrogen peroxide was periodically added to the tank to reduce the available chlorine in the water. This was not done to affect the dissolving rate of the tablet, but rather to control the chlorine odor within the working area and was a factor outside the control factors of the experiment.

Thus having described the invention, what is claimed is:

1. A swimming pool chemical tablet and storage container immersible in water for use in a forced circulation flow system to evenly dispense chemical over an extended period of time, comprising in combination:
   (a) a storage container with a top removable prior to immersion in water, a top lip portion cooperative with the removable top, a curved bottom with an outer angled portion and a central generally flat portion, a frusto-conoidally shaped sidewall formed by a closed plane curved surface having an increasing diameter extending from and connecting the upwardly curved bottom to the top lip portion; and
   (b) a frusto-conoidally shaped tablet of predetermined height with a bottom and a top, a bottom tapered sidewall portion, a generally straight sidewall portion above the bottom tapered sidewall portion and joined thereto along a radial sidewall contact surface to form, when inserted within the container, a tablet-sidewall bottom space below the sidewall contact surface in which water initially does not circulate, and a tablet-sidewall flow space in which water can freely circulate above the sidewall contact surface, the sidewall contact surface further contacting the frusto-conoidally shaped sidewall to control the rate of dissolution of the tablet when water is circulated in the forced circulation flow system.

2. The apparatus according to claim 1 wherein the top of the frusto-conoidally shaped tablet further has a central flat surface portion.

3. The apparatus according to claim 2 wherein the top of the frusto-conoidally shaped tablet with the central flat surface portion further has a central bore extending into the tablet at least partially from the central flat surface portion downwardly toward the bottom.

4. The apparatus according to claim 3 wherein the central bore further extends from the central flat surface portion of the top all the way to the bottom.

5. The apparatus according to claim 2 wherein the central flat portion of the top is generally circular and is adjacent a radial outer portion that is angled downwardly to the generally straight sidewall portion.

6. The apparatus according to claim 1 wherein the bottom of the tablet is generally circular and extends generally horizontally across the central generally flat portion of the bottom and across and over the outer angled portion of the bottom to a distance less than the distance to the frusto-conoidally shaped sidewall to form an extension of the tablet-sidewall bottom space beneath the tablet and above the outer angled portion of the bottom.

7. The apparatus according to claim 1 wherein the top of the container is cooperative with the top lip portion of the container is a locking arrangement to removably secure the top to the container.

8. The apparatus according to claim 1 wherein the radial sidewall contact surface is at a location at least equal to about one-half the predetermined height of the tablet extending from the bottom to the top of the tablet.

9. The apparatus according to claim 1 wherein the radial sidewall contact surface is at a location that is greater than about one-half the predetermined height of the tablet extending from the bottom to the top of the tablet.

10. The apparatus according to claim 7 wherein the removable top of the container further comprises an outer apron portion, the apron portion having serrations therein to facilitate gripping.

11. A swimming pool chemical dispensing system comprising, in combination:
    (a) a skimmer connectable through flow conduits to a forced water circulation flow system and a swimming pool, the skimmer having a support shelf beneath the normal operating level of water;
    (b) a storage container positioned on the support shelf having a top lip portion, a curved bottom with an outer angled portion and a central generally flat portion, a frusto-conoidally shaped sidewall formed by a closed plane curved surface having an increasing diameter extending from and connecting the curved bottom to the top lip portion; and
    (c) a frusto-conoidally shaped tablet of predetermined height with a bottom and a top, a bottom tapered sidewall portion, a generally straight sidewall portion above the bottom tapered sidewall portion and joined thereto along a radial sidewall contact surface to form with the container sidewall a tablet-sidewall bottom space below the radial sidewall contact surface in which water initially does not circulate and a tablet-sidewall flow space in which water can freely circulate when the forced circulation flow system is functioning, the tablet-sidewall flow space being above the radial sidewall contact surface, the radial sidewall-contact surface further contacting the frusto-conoidally shaped sidewall to control the rate of dissolution of the tablet when water is circulated in the forced circulation flow system.

12. The apparatus according to claim 11 wherein the top of the frusto-conoidally shaped tablet has a central flat surface portion.

13. The apparatus according to claim 12 wherein the frusto-conoidally shaped tablet has a central bore extending at least partially from the central flat surface portion of the top downwardly towards the bottom.

14. The apparatus according to claim 13 wherein the central bore extends completely from the central flat surface portion of the top to the bottom.

15. The apparatus according to claim 11 wherein the central flat surface portion of the top is generally circular and is adjacent a radial outer portion angled downwardly to the generally straight sidewall portion.

16. The apparatus according to claim 11 wherein the bottom of the tablet is generally circular and extends generally horizontally across the central generally flat portion of the bottom and across and over the outer angled portion of the bottom to a distance less than the distance to the bottom tapered sidewall to form an extension of the tablet-sidewall bottom space beneath the tablet and above the outer angled portion of the bottom.

17. The apparatus according to claim 13 wherein the radial sidewall contact surface is at a location at least equal to about one-half the predetermined height of the tablet taken from the bottom to the top of the tablet.

18. The apparatus according to claim 13 wherein the radial sidewall contact surface further is at a location greater than about one-half the predetermined height of the tablet taken from the bottom to the top of the tablet.

* * * * *